April 28, 1970   H. D. ANSPON ET AL   3,509,084
ION EXCHANGE PROCESS
Filed Oct. 26, 1966
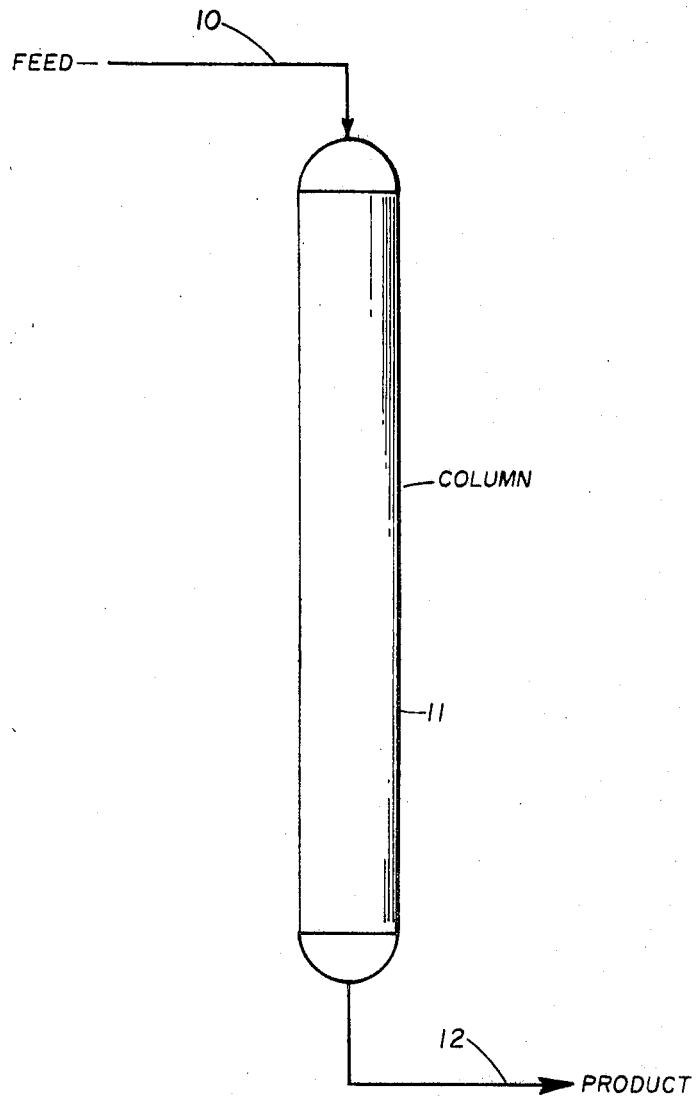
INVENTORS
H.D. Anspon
B.H. Clampitt
BY Ernest D. Stune `United States Patent Office`  3,509,084
Patented Apr. 28, 1970

3,509,084
ION EXCHANGE PROCESS
Harry D. Anspon, Kansas City, Mo., and Bert H. Clampitt, Overland Park, Kans., assignors to Gulf Research & Development Company, Pittsburgh, Pa., a corporation of Delaware
Filed Oct. 26, 1966, Ser. No. 590,459
Int. Cl. C08f 29/04, 45/22, 47/18
U.S. Cl. 260—29.6                      4 Claims

ABSTRACT OF THE DISCLOSURE

Basic aqueous dispersions containing metallic ions are contacted with strongly acidic ion exchange resins charged with ammonium ions to produce an aqueous dispersion substantially free of metallic ions.

This invention relates to a novel ion exchange process wherein a strongly acidic ion exchange resin charged with ammonium ions is contacted with a basic aqueous dispersion of normally solid particles containing metallic ions and an aqueous dispersion substantially free of metallic ions is recovered therefrom. In another aspect, this invention relates to the preparation of stable polyethylene latices substantially free of metallic ions employing an ion exchange process step. In yet another aspect, this invention relates to stable polyethylene latices and to a process for preparing such stable polyethylene latices.

The development of polyethylene latices sufficiently stable to be of practical industrial and commercial significance has long been an object of the chemical art. Aqueous emulsified polymers are of great utility in many industrial operations and a wide variety of polymers other than polyethylene has long been available commercially in the form of stable aqueous latices. As described in U.S. Patent 3,244,652, stable polyethylene latices of commercial and practical significance as polish components can be produced directly by the emulsion polymerization of ethylene. The latices described in the patent are directly prepared by emulsion polymerization of ethylene at polymerization temperatures and pressures in a charge mixture comprising water, an anionic emulsifying agent, a pH adjuster, in some cases an optional solvent, and a polymerization initiator. Emulsifiers conventionally employed in producing the stable latices are of three types: (1) the salts of saturated fatty acids, in particular the potassium salts of fatty acids having 12 to 18 carbon atoms, such as potassium stearate, myristate and laurate; (2) salts, particularly sodium salts, of sulfates of fatty alcohols having 12 to 18 carbon atoms, or mixtures thereof; and (3) salts, particularly sodium salts of sulfates of ethoxylated fatty alcohols having about 12 to 18 carbon atoms and an average number of ethoxy groups between 1 and 5.

The emulsion product of the ethylene polymerization process contains residual quantities of initiator and anionic emulsifying agent. In many applications, for example, where the produced polyethylene emulsions are employed in certain coating processes, it is desirable that the metallic ions be removed from the emulsion without reducing the stability of the emulsion.

Accordingly, an object of the invention is to provide a process for separating metallic cations from aqueous dispersions of normally solid materials containing such metallic cations.

Another object of the invention is to provide a stable aqueous polymeric dispersion substantially free of metallic cations and a process for preparing such dispersion.

Another object of the invention is to provide a stable aqueous polyethylene dispersion substantially free of metallic cations and a process for preparing such dispersion.

Still another object of the invention is to provide a novel ion exchange process and apparatus therefor.

Other objects, advantages and features of this invention will be readily apparent to those skilled in the art from the following description and appended claims.

By the invention, basic aqueous dispersions of normally solid materials containing metallic cations are contacted with an ion exchange medium comprising a strongly acidic cation exchange resin charged with ammonium ions with the ammonium ions exchanged for the metallic cations of the normally solid materials contained within the aqueous dispersions. With the ion exchange process applied to the above described polyethylene aqueous dispersions, the produced ammonium salt rapidly decomposes to form the carboxylic acid groups. Although not required, the composition of the ammonium salt is accelerated by the addition of heat.

Aqueous dispersions as the term is herein employed include those aqueous dispersions of normally solid materials having an average particle diameter of less than about two microns. Thus, the aqueous dispersions of this invention include solutions of normally solid materials and those dispersions conventionally referred to as aqueous emulsions. Thus, the terms "emulsion" and "dispersion" when applied to dispersed polyethylene will be used interchangeably for purposes of this invention.

The polyethylene emulsion product of the ion exchange process is a stable emulsion. The emulsion or latex is strip stable, mechanically stable, shelf-stable, and chemically stable. Reference is made to U.S. 3,244,652 for definition of the stability terms herein employed. The product emulsions can be usefully employed by conventional application processes furnishing polishes, paper coating and the like.

The polyethylene emulsion product of the ion exchange process is substantially free of metallic cations. The emulsifying agent present in the emulsion product is an ammonium salt of a saturated fatty acid, the ammonium salt of a sulfate of a fatty alcohol, the ammonium salt of an ethoxylated fatty alcohol, the acid decomposition product of the ammonium salt, or mixtures thereof. The concentration of emulsifier will suitably range from about 0.9 percent to about 9.0 percent by weight based upon the aqueous medium. Generally the emulsifier is present at between about 1.2 percent and about 3 percent by weight of the aqueous phase.

The invention, although not to be limited thereto, is particularly applicable in the preparation of stable polyethylene dispersions wherein the dispered polyethylene has a weight average molecular weight of at least 10,000.

The ion exchange medium employed in the process of this invention comprises a strongly acidic cation exchange resin charged with ammonium ions. Suitable strongly acidic exchange resins include conventional sulfonated polystyrene resins such as the resins manufactured and distributed by Dow Chemical Company under the trade name of Dowex-50. The ion exchange medium of this invention can be prepared by contacting the strongly acidic cation exchange resin with an aqueous solution, preferably saturated, of an inorganic or organic ammonium salt.

Although not to be limited thereto, it has been observed that ammonium chloride is particularly effective in charging the strongly acidic base resin with ammonium ions. Ammonium hydroxide can be employed to initially charge the strongly acidic cation exchange resin with ammonium ion, but it has been observed that regeneration of the ion exchange medium cannot be effectively accomplished with ammonium hydroxide.

The drawing illustrates a preferred embodiment of the invention.

Referring to the drawing, the invention as applied to the separation of metallic cations from aqueous dispersions or emulsion of polyethylene will be described. Column 11 contains a strongly acidic cation exchange resin in particulate form charged with ammonium ions. Although not to be limited thereto, the diameter size of the resin particles is preferably less than about ¼ inch. Particles ranging from 50 to 100 mesh have been observd to be particularly effective in preparation of the ion exchange medium. The particles can be charged with ammonium ions by passing an aqueous solution of an ammonium salt to column 11 via conduit means 10. The particles within the column can then be back-washed with water to provide proper bed distribution and to separate any foreign material from the cationic exchange resin.

A polyethylene aqueous emulsion prepared by the emulsion polymerization of ethylene utilizing potassium persulfate as the initiator and potassium myristate as emulsifying agent is introduced to the top of the ion exchange column 11 via conduit means 10. As the polyethylene aqueous emulsion flows downwardly through column 11, the ammonium ions of the ion exchange medium are exchanged for the potassium ions contained in the aqueous dispersion. The aqueous dispersion or emulsion, substantially free of potassium ions, is withdrawn from column 11 via conduit means 12. The ammonium salts present in the aqueous dispersion withdrawn from column 11 readily decompose to form the acid with decomposition accelerated by the application of heat. Although not to be limited thereto, the invention is particularly applicable in the separation of the alkali metals from basic aqueous dispersions of normally solid materials containing alkali metallic cations.

The invention is broadly applicable to the separation of metallic cations from basic aqueous dispersions of normally solid materials. The invention is particularly applicable to separation of metallic ions from aqueous dispersions or emulsions of polymeric materials containing anionic emulsifying agents. Polystyrene aqueous emulsions, vinyl acetate polymeric aqueous emulsions, acrylate and methacrylate polymeric aqueous emulsions and polyvinylydene chloride aqueous emulsions containing anionic emulsifying agents are illustrative of the aqueous systems found to be particularly suitable in the practice of the invention.

Preferably, the pH of the aqueous dispersion falls within the range of 8 to 12. The invention is applicable to aqueous dispersions of normally solid materials wherein the concentration of such materials varies over a wide range. Preferably, although not to be limited thereto, the viscosity of the aqueous dispersions employed in the inventive process will have a Brookfield of less than 200 centipoises.

Aqueous dispersions as the term is herein employed include those aqueous dispersions of normally solid materials having an average particle diameter of less than about 2 microns. Thus, the aqueous dispersions of this invention include those dispersions conventionally referred to as aqueous emulsions.

After utilization of the ion exchange medium in the ion exchange process, the medium will become charged with metallic cations. The metallic cations can become displaced with ammonium ions by contacting the strongly acidic ion exchange resin with an ammonium salt solution as heretofore described.

In "charging" the strongly acidic cation exchange resin with ammonium ions, the ammonium salt solution can be passed through the column in intimate contact with the base resin. The "charged" resin can then be washed with water until analysis of the effluent shows the absence of chloride ions where, for example, ammonium chloride is employed to charge the acidic ion exchange resin.

The following example is presented to illustrate the objects and advantages of the invention; however, it is not intended that the invention should be limited to the specific embodiments presented therein.

EXAMPLE

In this example the effectiveness of the invention to separate metallic ions from polyethylene emulsions prepared with the use of the anionic emulsifying agent is demonstrated. A 2¼ inch diameter glass column is filled to a height of 30 inches with fifteen hundred grams of Dowex 50–W–X4 cationic exchange resin (marketed by J. T. Baker Chemical Company, Phillipsburg, N.J.) in particulate form with the size of the particles in the range of 50–100 mesh. The column is back-washed with distilled water to provide proper bed distribution and to separate any foreign material from the cationic exchange resin. Fifteen hundred grams of ammonium chloride as a saturated aqueous solution of ammonium chloride is passed through the column. The column is then washed with distilled water until analysis of the effluent shows no chloride ions to be present.

A polyethylene aqueous emulsion containing 21 weight percent polyethylene solids and prepared by the emulsion polymerization of ethylene utilizing potassium persulfate as the initiator and potassium aristate as emulsifying agent is introduced to the top of the ion exchange column. A polyethylene emulsion contains a concentration of potassium aristate equivalent to 2.9 weight percent myristic acid. A pH of the emulsion introduced to the top of the ion exchange column is 10.9. The emulsion is permitted to pass through the column at a rate of 10–15 cc./minute. After 4500 ml. of the emulsion is passed through the column, the process is discontinued and the column back-washed with water and recharged with a solution of ammonium chloride. The aqueous dispersion withdrawn from the bottom of the ion exchange column contains no potassium and has a pH of 8.85. Film produced by conventional process from the polymer contained in the product dispersion is substantially less brittle than film produced from the aqueous dispersion charged to the ion exchange column. Film formation characteristics of the product dispersion are substantially superior to the film formation characteristics of the feed polymeric dispersion.

Although the invention has been described with reference to specific materials, embodiments and details, various modifications and changes, within the scope of this invention, will be readily apparent to those skilled in the art and are contemplated to be embraced in the invention.

What is claimed is:

1. A process which comprises introducing a basic polyethylene emulsion into an ion exchange zone, said basic polyethylene emulsion containing an emulsifying agent which contains a metallic cation, contacting an ion exchange medium with said polyethylene emulsion within said ion exchange zone, said ion exchange medium comprising a strongly acidic cation exchange resin charged with ammonium ions, exchanging said ammonium ions for said metallic cations within said ion exchange zone, and withdrawing from said ion exchange zone a stable polyethylene emulsion substantially free of metallic cations.

2. The process of claim 1 wherein said emulsifying agent is anionic and is selected from the group consisting of salts of saturated fatty acids having 12 to 18 carbon atoms, salts of sulfates of fatty alcohols having 12 to 18 carbon atoms, and salts of sulfates of ethoxylated fatty alcohols having about 12 to 18 carbon atoms and an average number of ethoxy groups between 1 and 5, and wherein the stable polyethylene emulsion recovered from said ion exchange zone contains an emulsifying agent selected from the group consisting of an ammonium salt of a saturated fatty acid, an ammonium salt of a sulfate of a fatty alcohol, an ammonium salt of an ethoxylated fatty alcohol, and the acid decomposition product of the ammonium salt.

3. A process which comprises passing a first aqueous solution selected from the group consisting of an ammonium hydroxide solution and an ammonium salt solution through an ion exchange zone containing a strongly acidic cation exchange resin, thereafter introducing a basic polyethylene emulsion into said ion exchange zone, the emulsifying agent of said basic polyethylene emulsion containing a metallic cation, contacting an ion exchange medium with said polyethylene emulsion within said ion exchange zone, said ion exchange medium comprising a strongly acidic cation exchange resin charged with ammonium ions, exchanging said ammonium ions for said metallic cations within said ion exchange zone, and withdrawing from said ion exchange zone a stable polyethylene emulsion substantially free of metallic cations.

4. The process of claim 3 to include thereafter passing an aqueous solution of an ammonium salt through said ion exchange zone for a time sufficient to recharge the strongly acidic cation exchange resin with ammonium ions.

References Cited

UNITED STATES PATENTS 2,580,325   12/1951   Scott et al.

OTHER REFERENCES

Kressman, T. R. E. et al., Cation Exchange with a Synthetic Phenolsulphonate Resin. In Journal Chemical Society (London) (1949), pp. 1190–1201. QD 1 C6.

MURRAY TILLMAN, Primary Examiner

W. J. BRIGGS, SR., Assistant Examiner

U.S. Cl. X.R.

260—94.9